Oct. 16, 1956  M. TRIBUS ET AL  2,766,619
ICE DETECTING APPARATUS
Filed July 26, 1953  2 Sheets-Sheet 1
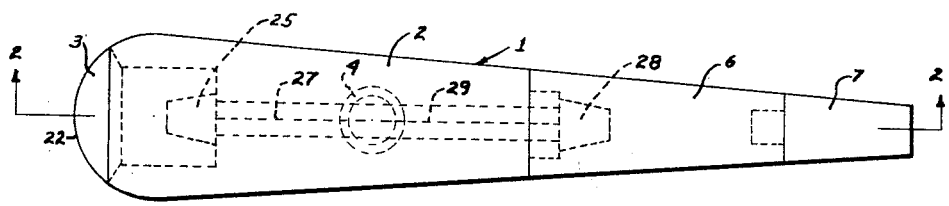
FIG. 1
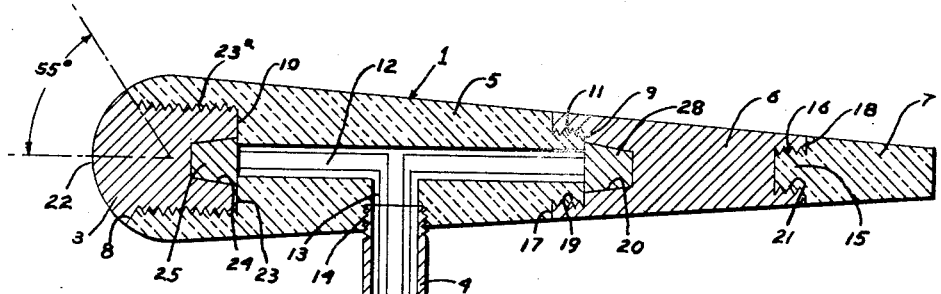
FIG. 2
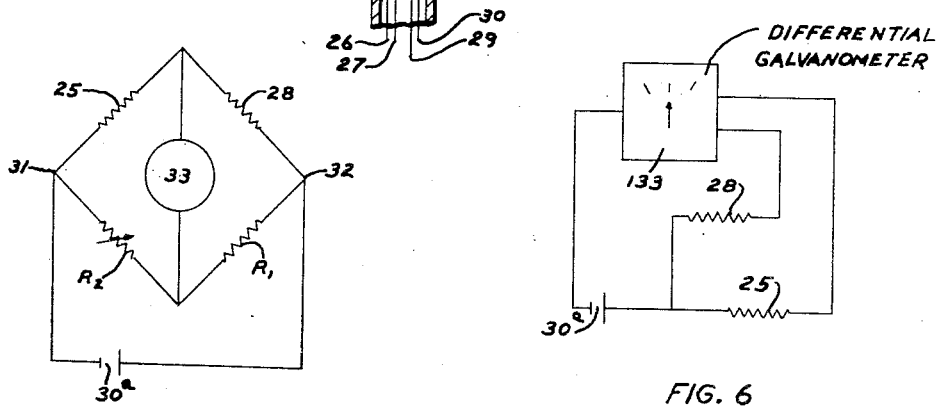
FIG. 3
FIG. 6
MYRON TRIBUS AND
MORTON P. MOYLE
INVENTORS
BY
Andrew K. Foulds
THEIR ATTORNEY

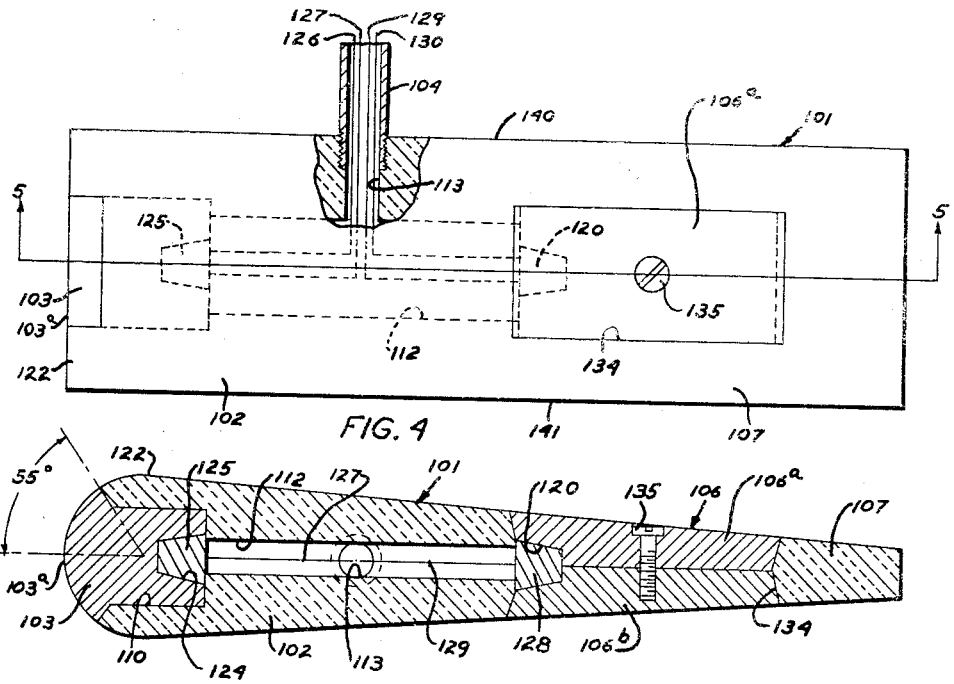
FIG. 4
FIG. 5
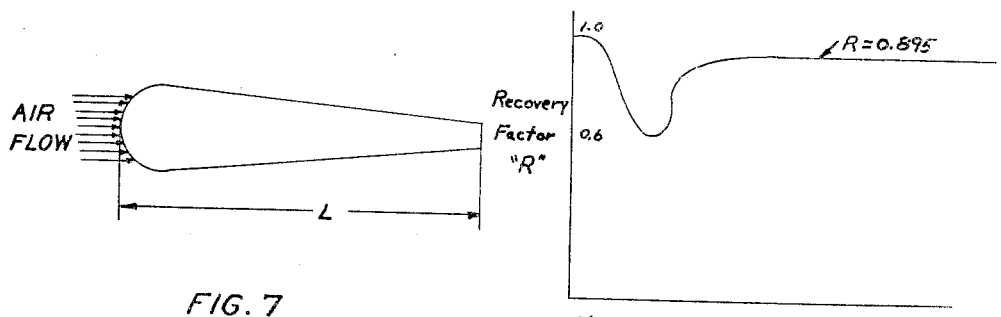
FIG. 7
FIG. 8
MYRON TRIBUS AND
MORTON P. MOYLE
INVENTORS.
BY Andrew K. ...
THEIR ATTORNEY United States Patent Office 2,766,619
Patented Oct. 16, 1956

2,766,619

ICE DETECTING APPARATUS

Myron Tribus and Morton P. Moyle, Ann Arbor, Mich., assignors to The Regents of The University of Michigan, Ann Arbor, Mich., a body corporate of the State of Michigan Application June 26, 1953, Serial No. 364,304

12 Claims. (Cl. 73—170)

This invention relates to a new and improved ice detecting apparatus and more particularly to a thermal responsive type of ice detector to be used in conjunction with aircraft.

One object of this invention is to provide an ice detecting apparatus that is relatively free from error caused by frictional heat, by change in temperature due to change in altitude, or by the presence of ice or snow in the atmosphere.

Another object of this invention is to provide a thermal responsive type ice detector that will indicate the presence of ice and the rate of increase and decrease of the ice by means of measuring the heat of fusion given up by the water as it freezes and adheres to a portion of the detector.

Another object is to provide an ice detector that does not require expensive parts and is economical to manufacture, easy to assemble and install, and rugged in construction.

A further object of this invention is to provide an ice detector that is free of moving parts and is not affected by the vibration that is incidental to the operation of aircraft.

Other objects of this invention will become apparent from the following description, the drawings to which it relates, and the claims hereinafter set forth.

This invention comprises new and improved construction and combination of parts and their operating relation to each other which will be more fully described hereinafter and the novelty of which will be particularly pointed out and distinctly claimed.

In the accompanying drawings, to be taken as part of the specification, there are fully and clearly illustrated two preferred embodiments of this invention, in which drawings;

Figure 1 is a top plan view of the ice detecting device,

Figure 2 is a sectional view taken along the line 2—2 in Figure 1,

Figure 3 is an electrical diagram of a Wheatstone bridge arrangement for registering conditions indicated by the ice detecting device, Figure 4 is a top plan view of another form of the ice detecting device, Figure 5 is a sectional view taken along the lines 5—5 in Figure 4, Figure 6 is an electrical diagram showing another type of measuring circuit for use with the detecting devices shown in Figures 1 and 4, Figure 7 is a diagrammatic view of a symmetrical air foil and the air flow over said airfoil, and Figure 8 is a graph showing the variation of the recovery factor at different points along the surface of the airfoil.

Referring to the drawings by characters of reference, and more particularly to Figure 1, there is shown an ice detecting device or ice detector 1 adapted to be positioned in an airstream for detecting icing conditions therein. The ice detecting device 1 comprises a substantially frustro-conical rear portion 2 and a spherically curved nose portion 3. A supporting conduit member 4 extends from and is secured in the conical portion 2. The conical portion 2 is so shaped that its base has a spherical contour merging with the spherically curved nose portion 3 and forms a symmetrical air foil of circular lateral cross section with the nose portion 3 serving as the leading edge and the conical portion 2 forming the trailing or rear edge of the air foil. When this device is positioned in an airstream, the leading edge of the air foil will tend to accumulate any ice that may be forming in the airstream, whereas the trailing edge or conical portion 2 will remain free from ice accretion.

Referring to Figure 2 is is seen that the conical portion 2 has a front section 5, a central or intermediate section 6, and a rear section 7. The front section 5 is composed of a material having a low coefficient of thermal conductivity such as a polyacrylic thermoplastic or the like. The front section 5 has a front wall 8 and a rear wall 9. The front wall 8 has a recessed portion 10 with threaded side walls. The rear wall 9 has a threaded portion 11 of reduced diameter. The front section 5 has a passageway 12 extending therethrough substantially along the central axis thereof. A second passageway 13 extends through the side wall of the front section 5 and intersects the longitudinal passageway 12. The passageway 13 has a threaded portion 14 which receives and secures in place the supporting conduit 4. The central conical section 6 is preferably made of a metal having a high coefficient of thermal conductivity such as aluminum or the like. The central conical section 6 has a front wall 17 with a threaded recess 19 therein and a second recess 20 of smaller diameter. The central conical section has a rear wall 18 with a threaded recess 21 therein. The rear conical section 7 has a portion of reduced diameter 15 which is threadedly secured as at 21 in the rear recess 16 of the central conical section 6. The front conical section 5 has its threaded portion 11 threadedly secured in the recess 19 of the central section.

The spherically curved nose portion 3 is preferably made of a metal having a high coefficient of thermal conductivity, such as aluminum or the like, and has a spherically curved front wall surface 22, a rear wall 23, and a rear threaded portion 23a of reduced diameter. The rear wall 23 has a frustro-conical recessed portion 24. A frustro-conical thermistor 25 is inserted in the recessed portion 24 in thermal contact with the semi-spherical nose portion 3. A pair of conductors 26 and 27 are connected to the thermistor 25 and extend through passageways 12 and 13 in the front conical section 5 and out through the supporting conduit member 4. The nose portion 3 is threaded into the front wall recess 10 in the front conical section 5 and cooperates therewith to provide a continuous airfoil surface. When the nose portion 3 is tightened in position, the thermistor 25, because of its frusto-conical shape, is held in rigid contact with the walls of the recess 24 in the nose portion 3. The thermistor 25 will therefore be maintained at substantially the same temperature as the nose portion 3. The term thermistor as used in this application is defined as a temperature responsive resistance that is highly sensitive to relatively small changes in temperature. The termistors 25 and 28 are thermally matched, i. e. they have the same percentage change in resistance per degree change of temperature. The thermistors used in the development of this apparatus had a negative change in resistance on the order of 4% per degree C.

When the front and central conical sections are being assembled a frustro conical thermistor 28 is inserted into the frustro conical recess 20 in the central conical section 6. A pair of conductors 29 and 30 are connected to the thermistor 28 and extend through passageways 12 and 13 in the front conical section 5 and out through the supporting conduit member 4. The central conical section 6 is threadedly connected to the front conical section 5 as at 11 thereby holding the thermistor 28 in rigid contact with the walls of the recess 20 in the central conical section 6. The thermistor 28 will therefore be maintained at the temperature of the central conical section 6. Since the front conical section 5 is composed of a material having a low coefficient of thermal conductivity, it acts as an insulating means between the nose portion 3 and the central section 6. Thus the temperatures indicated by thermistors 25 and 28 will be substantially independent of each other and will be the true temperatures of the nose portion 3 and central portion 6. The conductors 26, 27, 29, and 30 pass through the supporting conduit 4 which is theadedly secured to the front conical section 5. The nose portion 3 may, if desired, be provided with a heating element for eliminating any excessive ice formation thereon.

The nose portion 3 and central section 6 have certain rather critical area and shape limitations which will be described in detail in connection with the theory of operation of this device. The members 25 and 28 which are referred to as thermistors are actually aluminum plugs which encase the thermistors (which are very small in size) for more efficient heat transfer. However, the members 25 and 28 will continue to be called thermistors since they are thermistor units and are more easily referred to than the separate thermistors which are carried inside.

In Figure 3 there is shown a Wheatstone bridge type electrical circuit having a source of current shown as a battery 30ª. The current enters the bridge circuit at 31 and leaves at 32. One resistance of the bridge circuit is the thermistor 25 located in the nose portion 3. Another resistance of the bridge circuit is the thermistor 28 located in the central conical section 6. The other resistances of the bridge circuit are a fixed resistance R1 and a variable resistance R2 which is used in calibration or balancing of the circuit. An electrical indicator, such as a galvanometer or microammeter 33, is connected across the bridge circuit for measuring the state of balance of the circuit. The circuit is calibrated under normal conditions so that when the temperatures of thermistors 25 and 28 are equal no current will flow through the indicator 33. The matched thermistors 25 and 28 change by equal percentages with change in temperatures and thus keep the circuit balanced independently of ambient temperatures. Thus when the ice detecting device is positioned in an airstream and the thermistors are at equal temperatures the Wheatstone bridge is in balance, and the indicator will indicate a zero rate of ice formation on the aircraft appendages. Similarly when the nose thermistor 25 changes in temperature during icing or de-icing conditions (which will be described in more detail in the theory of operation) the Wheatstone bridge will become unbalanced and the indicator will register this unbalance in terms of icing or de-icing conditions.

Referring to Figures 4 and 5 there is shown an alternate form of this invention. The principal difference between the forms of invention shown is the shape of the detector. The detector shown in Figures 4 and 5 has a flat symmetrical air foil shape. In describing this form of invention, similar numerals will be used for similar parts shown in Figures 1 and 2 with the addition of 100 to said numerals. In Figure 4 there is shown a detector 101 having a main body portion 102 with flat parallel side walls 140 and 141, a cylindrically curved nose portion, and a flat tapered tail portion forming a symmetrical air foil. The body portion 102 is composed of a material having a low coefficient of thermal conductivity which acts as an insulating means. The body portion 102 has a cylindrically curved front wall or nose portion 122 having a recess 110 therein. The body portion 102 also has an aperture 134 extending through the trailing edge or rear portion 107 thereof. A passageway 112 extends between the recess 110 and aperture 134 substantially along the central axis of the body portion 102. A second passageway 113 extends from the side wall 140 of the body portion 102 and intersects the central passageway 112. A supporting conduit 104 is threadedly secured in the passageway 113.

In the aperture 134 there is positioned a member 106 which has two sections 106ª and 106ᵇ held together in position by a screw 135. The sections 106ª and 106ᵇ are formed of a metal having a high thermal conductivity and have tapered side walls which cooperate with the tapered walls of the aperture 134 so that when these sections are positioned in opposite ends of the aperture and tightened together they cannot slip through from one side to the other. The members 106ª and 106ᵇ have cooperating recessed portions which when positioned together form a frusto conical recess 120 at the end of the passageway 112. A metallic member 103 is inserted in the recess 110 of the curved front wall 122 and has a frusto conical recess 124 in the rear wall thereof. The members 103 and 106 are preferably composed of a metal having a high coefficient of thermal conductivity such as aluminum or the like and may be referred to from time to time as heat conducting members. A frusto conical thermistor 125 is inserted in the nose portion recess 124 and nose portion 103 is pressed into position until its cylindrical end surface 103ª forms a smooth continuation of the cylindrical airfoil surface 122. As in the case of the nose portion 3 in Fig. 2, the nose portion 103 of this device has certain rather critical area and shape limitations which will be described more fully in connection with the theory of operation. Conductors 126 and 127 are connected to the thermistor 125 and extend through passageways 112 and 113 and out through supporting conduit 104. A frusto conical thermistor 128 is positioned in recess 120 in the rear heat conducting member 106. Conductors 129 and 130 are connected to the thermistor 128 and extend out through passageways 112 and 113 and conduit 104. The thermistors 125 and 128 are connected in a bridge circuit as were thermistors 25 and 28 in Figure 3. In this form of the invention when the detector is positioned in an airstream under icing conditions ice will accumulate on the nose member 103, whereas the member 106 will remain free from ice accumulation and continue to indicate the free air temperature.

In Figure 6 there is shown an alternate indicating circuit for the thermistors 25 and 28. The thermistors 25 and 28 are connected in parallel between a battery 30ª and a differential galvanometer 133. The differential galvanometer is of a standard type having opposed electromagnetic coils, which deflect an indicator in accord with a current difference. When one of the thermistors changes resistance due to a temperature change the indicator 133 will register the degree of change.

*Operation*

In the description of operation of this device and in the claims the nose portions 3 and 103 and the rear metal members 6 and 106 may from time to time be referred to as the front and rear heat conducting portions or heat conducting members. These heat conducting portions together with their associated thermistors may be referred to as the front or rear temperature responsive means.

The basic theory under which this ice detecting apparatus is designed to function is to measure the temperature differential created by ice formation and transmit the same through a Wheatstone bridge or other indicating circuit to an indicator in the pilots compartment, thereby warning the pilot of the impending danger of ice formation on the various portions of the aircraft. The temperature differential is measured by the difference in temperature of the nose temperature responsive means and the rear temperature responsive means. In order for this device to give a proper indication, at more than one particular condition of airspeed and ambient temperature the front and rear temperature responsive means must be proportioned for equal aerodynamic heating at all airspeeds and for equal rates of temperature change when passing through different temperature zones.

In order to proportion the temperature responsive means properly we must give consideration to the theory of aerodynamic heating and heat transfer processes in the unsteady state. When a moving airstream is brought to rest against a flat surface so that substantially its entire energy of motion is converted into heat of compression there will occur a rise in temperature in the boundary air layer at the surface which will equal $$\frac{V^2}{2gJC_p}$$

where V is velocity, g is the gravity constant, J is the factor for converting mechanical energy into heat, and $C_p$ is the thermal capacity of air.

When the interaction between a curved surface, such as a cylinder, sphere, or airfoil, and a moving airstream is considered it is found that the temperature rise at the surface at different points is equal to $$\frac{V^2}{2gJC_p}$$

times a factor R, called the thermal recovery factor. This recovery factory varies at different points along a curved surface. In Fig. 7 there is shown a diagrammatic view of an airfoil having either a cylindrically or spherically curved nose and a tapered tail portion and having a length designated L. In Fig. 8 the recovery factor R is plotted on a graph against the length of the airfoil shown in Fig. 7. It has been found that the recovery factor begins at a value 1.0 at the center of the nose portion of the airfoil and decreases with distance along the curved surface thereof. The recovery factor reaches a minimum value of about 0.60 just before the zone of turbulence is reached. The recovery factor then increases sharply in the zone of turbulence to a value of 0.895 which remains substantially constant (the only variation appears in the third decimal place) for the remaining length of the airfoil.

If we apply the foregoing data, relating to the recovery factor, to the design of our ice detector we find that if the rear metal member 6 or 106 is positioned in the zone of turbulence it will be subject to a constant recovery factor and therefore a constant surface temperature regardless of its surface area or the air speed or ambient temperature.

In designing the metal nose portion 3 or 103 we assume that, because of its small size and high thermal conductivity, it is at a constant temperature throughout its mass. This assumption is not completely true but the error introduced is so small as to be inconsequential. If we make the metal nose portion of a size such that the average recovery factor over its surface is equal to the recovery factor (0.895) in the zone of turbulence then it will have an average surface temperature which is the same as that of the rear metal member and which is independent of airspeed or ambient temperature. The size of the exposed surface of the spherical or cylindrical nose portion which will have an average recovery factor of 0.895 is expressed in terms of the angle of exposure and is determined by a process of graphical integration. The required size of exposed surface or angle of exposure was found to be a spherical segment or cylindrical section extending through a 55° angle on each side of center, as indicated in Figures 2 and 5. The angle can also be expressed as the angle relative to the longitudinal axis or center plane of the airfoil or the angle relative to the stagnation point, which is at the center of the nose portion of a symmetrical air foil. The angle of 55° was found to be critical to the extent of about plus or minus 2°. From the foregoing explanation it is seen that the size of the nose portion is critical, if a constant recovery factor is to be had, while the size of the rear metal member has no effect on its recovery factor as long as it is positioned in the zone of turbulence.

In addition to designing the nose and rear portions for equal aerodynamic heating it is necessary to design them for equal rates of temperature change on passing through variable temperature conditions. The rate of temperature change is determined by the heat transfer formula for the unsteady state:

$$\frac{dt}{d\theta} = \frac{h_c A}{W C_p}(t_a - t_s)$$

where $$\frac{dt}{d\theta}$$

is the rate of change of temperature per unit of time, W is the weight of the metal, $C_p$ is the heat capacity of the metal, $h_c$ is the unit thermal conductance for the unsteady state, A is the surface area, $t_a$ is the temperature of the surface layer of air, and $t_s$ is the temperature of the metal surface. In order to make $$\frac{dt}{d\theta}$$

equal for both the nose portion and rear metal member the value $$\frac{h_c A}{W C_p}(t_a - t_s)$$

must be equal for both of them. Since the recovery factors for both the nose portion and the rear metal member were made equal (by the design of the nose portion) the surface air temperatures $t_a$ are equal. We are designing for equal surface temperatures and therefore assume equal values of $t_s$. The values for W, $C_p$, and A are fixed by the type of metal used and the exposed surface angle of the nose portion. The value of $h_c$ can be calculated from standard heat transfer blades and verified experimentally. Therefore the foregoing design of the nose portion for a constant recovery factor will also fix a constant value for the term $$\frac{h_c A}{W C_p}$$

The terms W, $C_p$, and $h_c$ are fixed for the rear metal member by the type of metal selected and its heat characteristics. The calculation of the value of A then becomes a relatively simple mathematical problem. When the value of A is calculated and the rear metal member is made that size it will have a rate of temperature change equal to the nose portion. The rear conical section 7 in Fig. 2 and the extreme rear portion of the trailing edge 107 in Fig. 5 provide an insulating means along the rear wall of the metal members 6 and 106 to prevent any substantial heat transfer along said rear walls so that only the exposed wall surfaces will have to be considered in equalizing the rate of temperature change for the nose portion and rear section.

With the angle of exposed surface area of the metal nose portion and the area of the rear metal member proportioned as just described so that they are at equal temperatures under normal conditions, the bridge circuit shown in Figure 3 will be balanced and no current will flow through the indicator 33. The indicator thus gives an indication of zero for ice free flight. When the aircraft enters a condition of icing, supercooled water droplets strike the nose portion and freeze thereon. During the process of freezing, the water gives up its heat of fusion which in turn increases the temperature of the nose portion and the thermistor 25 proportionately to the amount of heat given off by the water as it freezes. The thermistor 25 does not receive all of the heat of fusion of the ice which is forming since some of the heat is lost to the surrounding airstream. However, the rise of temperature of the nose portion is substantially proportional to the rate of ice formation. The rear temperature responsive means is free from the ice formation due to the air foil shape of the detecting device and the rear portion continues to transmit the temperature of the boundary air layer to the thermistor 28. Since the resistances of the thermistors 25 and 28 are functions of their temperatures, thermistor 25 will have a lesser resistance than thermistor 28 due to the increase in temperature of the thermistor 25 caused by ice formation on the nose portion. Thus with the thermistor 25 having a lesser resistance, the Wheatstone bridge circuit will be unbalanced and the indicator 33 will give a positive indication of the degree of unbalance and thus the formation of ice.

The temperature difference across the detector is both a warning signal of the initial formation of ice and also an indicator of the rate of icing. The greater the amount of icing, the more the temperature of the nose portion will rise with respect to the surrounding air since the temperature difference is brought about by the ice formation liberating the heat of fusion. Thus the quantity of ice formed is proportional to the heat of fusion liberated and transmitted to the thermistor 25. The quantity of ice being formed will therefore be indicated directly by the rise in temperature of the thermal responsive nose portion with which the ice is in contact. The temperature differential between the nose portion and the rear portion will remain constant as long as the icing continues at a constant rate. If the rate of icing increases the temperature differential will also increase. If the rate of icing decreases the temperature differential will decrease proportionately. Thus the temperature differential is a direct indication of the rate of ice formation on the ice detecting device. The indicator 33 may be calibrated in units indicating the rate of icing.

When the ice build-up on the nose portion becomes excessive, a source of error arises. The rate of dissipation of heat into the atmosphere is proportional to the outer surface area of the ice layer and the surface area of the thermal responsive nose portion. Thus for a given rate of ice formation, the temperature differential will be less after a substantial thickness of ice has formed and a smaller rate of ice formation will be indicated. To remedy this source of error, a heating element may be installed in the thermal responsive nose portion 3 which can be energized periodically to free the nose portion of the ice formation and permit an error free indication of the rate of ice formation.

When the icing ceases, the liberation of the heat of fusion will also cease and the temperature differential between the thermal responsive bodies disappears. It should be noted that the temperatures of the thermal responsive bodies will equalize although the nose portion remains covered with a layer of ice and is not directly subjected to the heat of air compressibility or friction. This is so because the heat of compression of the air and the frictional heat is imparted to the ice and is transferred to the nose portion.

There are several methods by which the ice accumulated on the aircraft may decrease. The ice may evaporate due to decrease in relative humidity of the air surrounding the aircraft or may melt as the result of an increase in temperature above the freezing point. The ice detecting device herein disclosed will give a negative reading under both of the above stated conditions. During the evaporation of the ice the heat of vaporization is taken from the ice thus resulting in a temperature decrease of the ice. The decrease in temperature of the ice will result in a decrease in temperature of the nose portion. The rear portion remains subjected to the free air temperature which is relatively constant. Therefore a temperature differential will result with the temperature of the nose portion being less than that of the rear portion. Since the resistances of the thermistors are functions of the temperature, a decrease in temperature of the nose thermistor will cause it to have a greater resistance which in turn will unbalance the bridge circuit in the opposite direction, thus giving a negative or de-icing reading on the indicator 33. Similarly, when the aircraft passes through free air having an effective temperature (i. e. air temperature plus the temperature rise caused by aerodynamic heating) above freezing, the ice will begin to melt. The rear thermistor 28 will be heated to a value equal to the free air temperature plus the rise due to aerodynamic heating while the nose thermistor will remain at the temperature of the ice. This temperature difference will therefore unbalance the bridge circuit in a negative direction and give a de-icing indication on the indicator 33.

Another important feature of this ice detecting device is the ability of the detector to predict icing conditions when the aircraft is passing through water-laden clouds. As an example, when the air temperature in the cloud formation is above freezing, the water droplets may be cooler than the surrounding air. The water droplets that strike the nose portion do not freeze and give up their heat of fusion. However, while passing through a condition of water-laden air the water droplets tend to cool the nose portion. The nose portion will therefore have a slightly lower temperature than the rear portion which will unbalance the bridge circuit negatively and indicate a de-icing condition.

It is to be understood that it is within the scope of this invention to use either an electrical or mechanical connection between the bridge circuit and the mechanical or electrical de-icing mechanism that may be used on the aircraft. The indicator or indicating means could therefore be any electrical means which would register the unbalance of the bridge circuit. This indicator could be an electric relay which would actuate automatically the de-icing equipment which would thereby indicate the presence of icing conditions. The term indicator or indicating means, as used in the claims, is therefore given a broader meaning than a mere gage. The term indicator or indicating means is intended to embrace any means which gives a positive action in response to the unbalancing of the bridge circuit and by that action gives an indication of icing conditions. An automatic de-icing of the aircraft could thus be accomplished without the use of an indicator gage or separate mechanical control by the pilot. The mode of operation which has been described for this detector in a bridge circuit is substantially the same when the circuit of Figure 6 is used. In that circuit the unbalancing of the thermistors in the detector due to icing conditions results in an unbalanced condition of the opposed coils in the differential galvanometer which will thereupon give an indication of icing. As in the case of the other circuit, the circuit of Figure 6 could actuate a differential relay which would indicate by turning on a signal light or the de-icing equipment or the like.

Although only two embodiments of this invention have been disclosed, it is to be understood that other embodiments may be used in which there are nose and rear temperature responsive elements which are proportioned for equal recovery factors and equal rates of temperature change and this invention is intended to be limited only by the appended claims.

Having thus described the invention, what is claimed and is desired to be secured by Letters Patent of the United States is:

1. An ice detecting apparatus for aircraft comprising a first heat conducting member, means supporting said heat conducting member in the aircraft airstream in a position subject to ice formation, a second heat conducting member, means supporting said second heat conducting member in a position thermally insulated from said first heat conducting member at a point free from ice formation, said members having their exposed surfaces and masses proportioned for equal aerodynamic heating and equal rates of temperature change upon change in ambient temperature, a pair of thermally matched thermistors positioned in thermal contact with and operable to sense temperature changes in said heat conducting members, a Wheatstone bridge circuit including said thermistors and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

2. An ice detecting apparatus for aircraft comprising a first heat conducting member, means supporting said heat conducting member in the aircraft airstream in a position subject to ice formation, a second heat conducting member, means supporting said second heat conducting member in a position thermally insulated from said first heat conducting member at a point free from ice formation and having a constant thermal recovery factor, said first heat conducting member having a surface angle of exposure having an average thermal recovery factor equal to said constant thermal recovery factor, said second heat conducting member having its exposed surface and mass proportioned relative to said first heat conducting member so that both have equal rates of change of temperature with changes in ambient temperature, a pair of thermally matched thermistors positioned in thermal contact with and operable to sense temperature changes in said heat conducting members, a Wheatstone bridge circuit including said thermistors and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

3. An ice detecting apparatus for aircraft comprising a detector member having a curved nose portion and a tapered rear portion; said detector member having a central supporting portion formed of a thermal insulating material, a first heat conducting member supported on said central portion and forming a part of said curved nose portion, a second heat conducting member supported on said central portion and forming a part of said tapered rear portion, and a rear portion of thermal insulating material positioned to the rear of and in insulating relation with the rear surface of said second heat conducting member; means secured to said central portion for supporting said detector member on an aircraft with said nose portion facing into the airstream, said second heat conducting member being positioned at a region on said tapered rear portion having a constant thermal recovery factor, said first heat conducting member having a surface angle of exposure having an average thermal recovery factor equal to said constant thermal recovery factor, said second heat conducting member having its exposed surface and mass proportioned relative to said first heat conducting member so that both have equal rates of change of temperature with change in ambient temperature, and means positioned in thermal contact with said heat conducting members to indicate the occurrence of a temperature differential therebetween.

4. An ice detecting apparatus for aircraft comprising a detector member having a curved nose portion and a tapered rear portion; said detector member having a central supporting portion formed of a thermal insulating material, a first heat conducting member supported on said central portion and forming a part of said curved nose portion, a second heat conducting member supported on said central portion and forming a part of said tapered rear portion, and a rear portion of thermal insulating material positioned to the rear of and in insulating relation with the rear surface of said second heat conducting member; means secured to said central portion for supporting said detector member on an aircraft with said nose portion facing into the airstream, said second heat conducting member being positioned at a region on said tapered rear portion having a constant thermal recovery factor, said first heat conducting member having surface angle of exposure having an average thermal recovery factor equal to said constant thermal recovery factor, said second heat conducting member having its exposed surface and mass proportioned relative to said first heat conducting member so that both have equal rates of change of temperature with change in ambient temperature, a pair of thermally matched thermistors positioned in thermal contact with and operable to sense temperature changes in said heat conducting members, a Wheatstone bridge circuit including said thermistors and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

5. An ice detecting apparatus for aircraft comprising a detector member having a spherically curved nose portion and a conically tapered rear portion; said detector member having a supporting portion of thermal insulating material having a spherical curvature at one end and a conical taper toward the other end, a first heat conducting member having a spherical curvature and carried by said supporting portion and forming therewith said spherically curved nose portion, a second heat conducting member having a conical taper and carried by said other end of said supporting portion, and a conically tapered insulating member carried by said second heat conducting member and forming the rear end of said conically tapered rear portion; means secured to said supporting portion for supporting said detector member on an aircraft with said nose portion facing into the airstream so that only said nose portion is subject to ice formation, said second heat conducting member being carried by said supporting portion in a region having a constant thermal recovery factor, said first heat conducting member having a spherical surface presenting an angle of exposure having an average thermal recovery factor equal to said constant thermal recovery factor, said second heat conducting member having a predetermined length providing an exposed surface and mass having a rate of change of temperature with change in ambient temperature equal to that of the first heat conducting member, and means positioned in thermal contact with said heat conducting members to indicate the occurrence of a temperature differential therebetween.

6. An ice detecting apparatus for aircraft comprising a detector member having a spherically curved nose portion and a conically tapered rear portion; said detector member having a supporting portion of thermal insulating material having a spherical curvature at one end and a conical taper toward the other end, a first heat conducting member having a spherical curvature and carried by said supporting portion and forming therewith said spherically curved nose portion, a second heat conducting member having a conical taper and carried by said other end of said supporting portion, and a conically tapered insulating member carried by said second heat conducting member and forming the rear end of said conically tapered rear portion; means secured to said supporting portion for supporting said detector member on an aircraft with said nose portion facing into the airstream so that only said nose portion is subject to ice formation, said second heat conducting member being carried by said supporting portion in a region having a constant thermal recovery factor, said first heat conducting member having a spherical surface presenting an angle of exposure having an average thermal recovery factor equal to said constant thermal recovery factor, said second heat conducting member having a predetermined length providing an exposed surface and mass having a rate of change of temperature with change in ambient temperature equal to that of the first heat conducting member, a pair of thermally matched thermistors positioned in thermal contact with and operable to sense temperature changes in said heat conducting members, a Wheatstone bridge circuit including said thermistors and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

7. An ice detecting apparatus for aircraft comprising a detector member having a spherically curved nose portion and a conically tapered rear portion; said detector member having a supporting portion of thermal insulating material having a spherical curvature at one end and a conical taper toward the other end, said supporting portion having a threaded recess at said one end and a threaded portion of reduced diameter at said other end, said supporting portion also being provided with a longitudinally axial passageway extending therethrough and a lateral passageway opening outward from said axial passageway, a front heat conducting member having a threaded portion of reduced diameter secured in said threaded recess and a spherically curved surface at one end forming a part of said curved nose portion, said heat conducting member having a conically tapered recess at its other end, a rear heat conducting member conically tapered and having threaded recesses at both ends, one of said last named recesses being secured on said supporting portion threaded portion and having a smaller conically tapered recess registering with the end of said axial passageway, a conically tapered thermal insulating member having a threaded portion of reduced diameter secured in the other of said last named threaded recesses and forming the rear end of said tapered rear portion; a conduit member threadedly secured in said lateral passageway and adapted to support said detector member on an aircraft with said nose portion facing into the airstream so that only said nose portion is subject to formation of ice thereon, said supporting portion supporting said rear heat conducting member in a region having a constant thermal recovery factor, said front heat conducting member spherical surface having an angle of exposure having an average thermal recovery factor equal to said constant thermal recovery factor, said rear heat conducting member having a predetermined length providing an exposed surface and mass having a rate of change of temperature with change in ambient temperature equal to that of the front heat conducting member, a pair of thermally matched thermistors conically tapered to fit in close thermal contact in said conically tapered recesses and operable to sense temperature changes in said heat conducting members, a plurality of electrical conductors connected to said thermistors and extending outward through said axial passageway and said supporting conduit member, a Wheatstone bridge circuit including said thermistors as resistances therein and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

8. An ice detecting apparatus as defined in claim 7 in which the angle of exposure of said spherical surface is 53° to 57° measured from the longitudinal axis of said detector member.

9. An ice detecting apparatus for aircraft comprising a supporting member of thermal insulating material having the shape of a flat symmetrical airfoil with a cylindrically curved nose portion and a tapered rear portion, a first heat conducting member having a cylindrical curvature and carried by said supporting member and forming a part of said nose portion, a second heat conducting member supported in and having an exposed surface forming a part of said tapered rear portion, means secured to said supporting member for supporting the same on an aircraft with said nose portion facing into the airstream so that only said nose portion is subject to ice formation, said second heat conducting member being positioned on said supporting member in a region having a constant thermal recovery factor, said first heat conducting member having a cylindrical surface presenting an angle of exposure having an average thermal recovery factor equal to said constant thermal recovery factor, said second heat conducting member having its exposed surface and mass proportioned relative to said first heat conducting member so that both have equal rates of change of temperature with change in ambient temperature, and means positioned in thermal contact with said heat conducting members to indicate the occurrence of a temperature differential therebetween.

10. An ice detecting apparatus for aircraft comprising a supporting member of thermal insulating material having the shape of a flat symmetrical airfoil with a cylindrically curved nose portion and a tapered rear portion, a first heat conducting member having a cylindrical curvature and carried by said supporting member and forming a part of said nose portion, a second heat conducting member supported in and having an exposed surface forming a part of said tapered rear portion, means secured to said supporting member for supporting the same on an aircraft with said nose portion facing into the airstream so that only said nose portion is subject to ice formation, said second heat conducting member being positioned on said supporting member in a region having a constant thermal recovery factor, said first heat conducting member having a cylindrical surface presenting an angle of exposure having an average thermal recovery factor equal to said constant thermal recovery factor, said second heat conducting member having its exposed surface and mass proportioned relative to said first heat conducting member so that both have equal rates of change of temperature with change in ambinet temperature, a pair of thermally matched thermistors positioned in thermal contact with and operable to sense temperature changes in said heat conducting members, a Wheatstone bridge circuit including said thermistors and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

11. An ice detecting apparatus for aircraft comprising a supporting member of thermal insulating material having the shape of a flat symmetrical airfoil with flat parallel side walls, a cylindrically curved nose portion, and a tapered rear portion; said supporting member having a recess in said nose portion, an aperture extending therethrough substantially normal to the surface of said rear portion, a longitudinal passageway connecting said recess and said aperture, and a lateral passageway extending from one of said side walls to intersect said longitudinal passageway; a front heat conducting member fitted in said recess and having a cylindrical surface at one end forming a part of said cylindrically curved nose portion, said heat conducting member having a conically tapered recess at its other end, a rear heat conducting member formed in two sections fitted in opposite ends of said aperture, means securing said two sections together with their surfaces forming a part of said tapered rear portion, said rear heat conducting member having a conically tapered recess at the parting line of said two sections at the rear end of said longitudinal passageway, a conduit member threadedly secured in said lateral passageway and adapted to support said supporting member on an aircraft with said nose portion facing into the airstream so that only said nose portion is subject to ice formation, said rear heat conducting member being positioned in a region having a constant thermal recovery factor, said front heat conducting member cylindrical surface having an angle of exposure having an average thermal recovery factor equal to said constant thermal recovery factor, said rear heat conducting member having a predetermined exposed surface and mass having a rate of change of temperature with change in ambient temperature equal to that of the front heat conducting member, a pair of thermally matched thermistors conically tapered to fit in close thermal contact in said conically tapered recesses and operable to sense temperature changes in said heat conducting members, a plurality of electrical conductors connected to said thermistors and extending outward through said longitudinal passageway and said supporting conduit member, a Wheatstone bridge circuit including said thermistors as resistances therein and adjusted to be in balance when said thermistors are at equal temperatures, and electric indicating means connected across said Wheatstone bridge circuit and operable to be actuated upon unbalancing of the circuit upon change in temperature of one of said thermistors relative to the other.

12. An ice detecting apparatus as defined in claim 11 in which the angle of exposure of said cylindrical surface is 53° to 57° measured from the longitudinal axis of said supporting member.

References Cited in the file of this patent

UNITED STATES PATENTS

| | | |
|---|---|---|
| 1,551,129 | Bast et al. | Aug. 25, 1925 |
| 2,541,512 | Hahn | Feb. 13, 1951 |
| 2,588,840 | Howland | Mar. 11, 1952 |

FOREIGN PATENTS

| | | |
|---|---|---|
| 343,017 | Great Britain | Jan. 28, 1931 |
| 674,750 | Great Britain | July 2, 1952 |